(No Model.) 2 Sheets—Sheet 1.
E. BÜHLER.
TIMING APPARATUS FOR PHOTOGRAPHIC PRINTING.
No. 595,368. Patented Dec. 14, 1897.
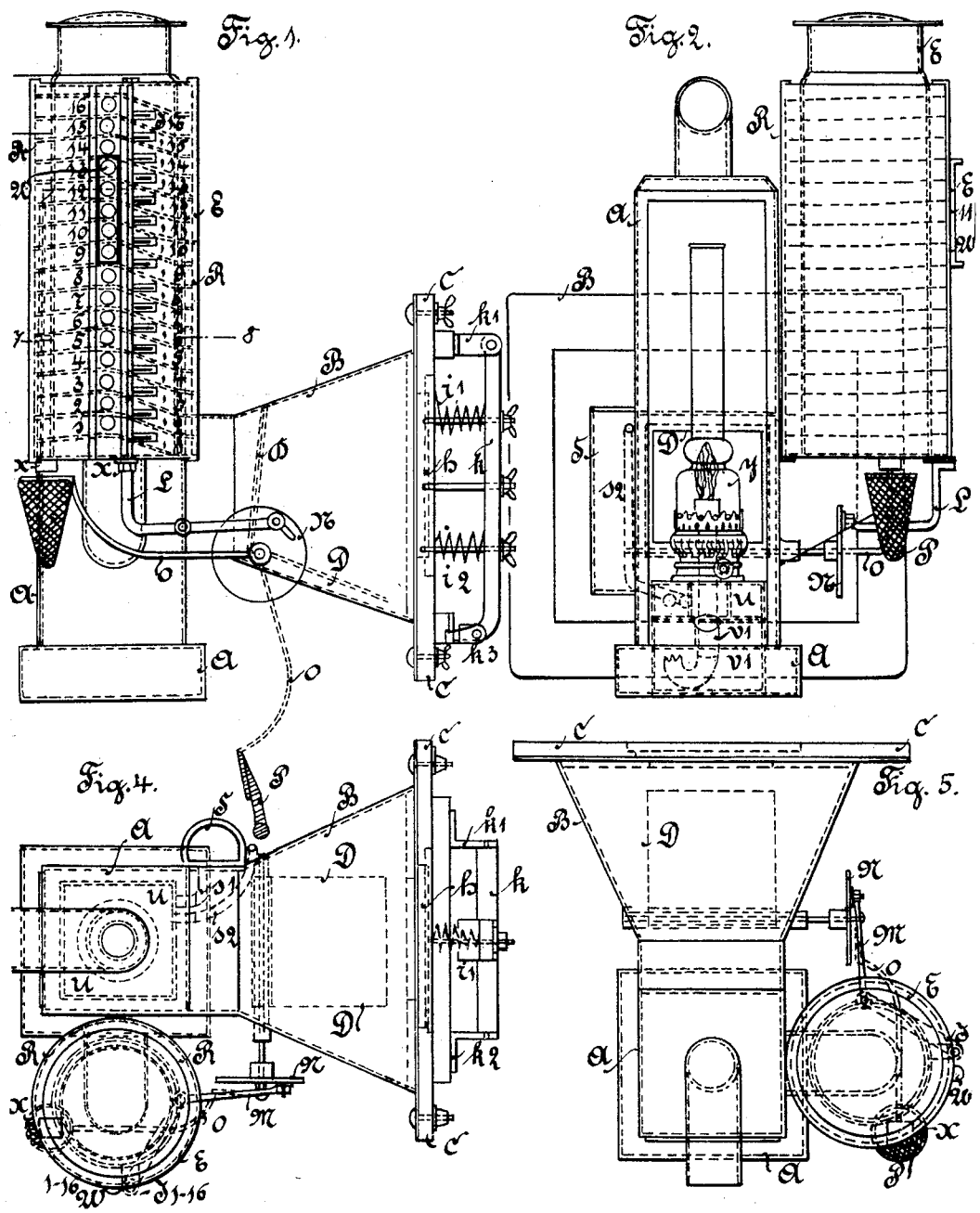
Witnesses:
Franz Grasnick
Emil Kaysser
Inventor
Emil Bühler
by Wm E. Boulter
Attorney

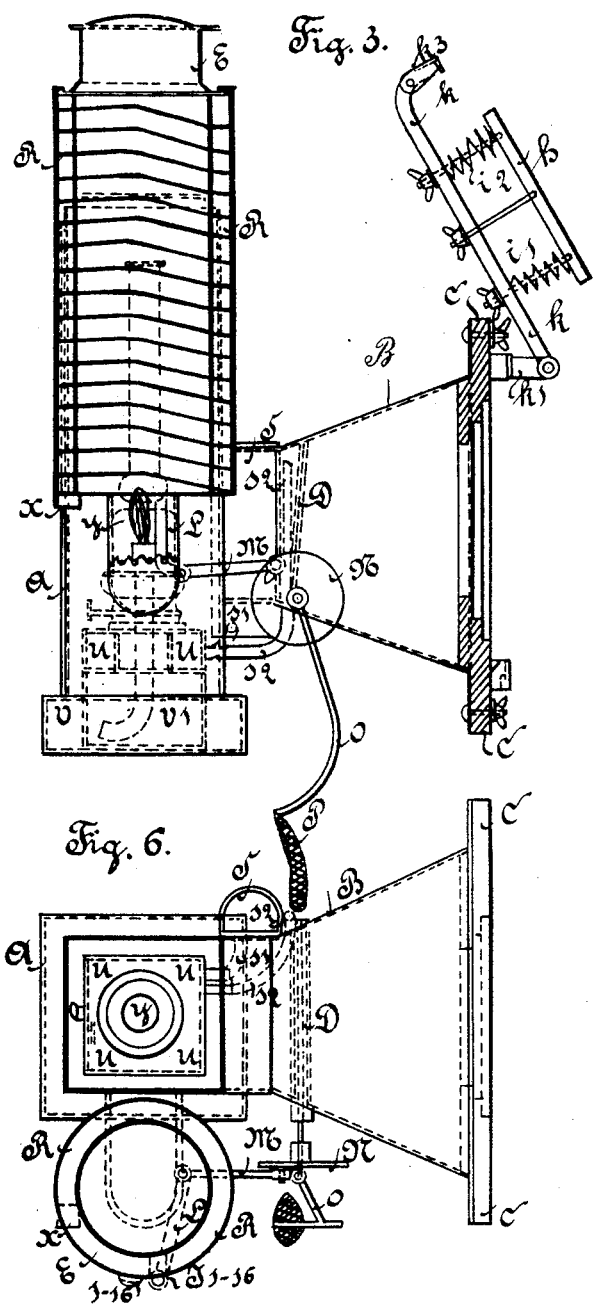

UNITED STATES PATENT OFFICE.

EMIL BÜHLER, OF SCHRIESHEIM, GERMANY.

TIMING APPARATUS FOR PHOTOGRAPHIC PRINTING.

SPECIFICATION forming part of Letters Patent No. 595,368, dated December 14, 1897.

Application filed July 27, 1897. Serial No. 646,108. (No model.)

*To all whom it may concern:*

Be it known that I, EMIL BÜHLER, a subject of the Grand Duke of Baden, and a resident of Schriesheim, near Heidelberg, in the Grand Duchy of Baden, German Empire, have invented an Improved Copying Apparatus for Photographs, of which the following is an exact specification.

This invention relates to an apparatus for copying photographs by aid of artificial light; and the purpose proper of my invention is to enable an unskilled person to easily determine the time necessary for obtaining a good copy. I attain that object by means of the improved apparatus represented in the accompanying drawings, in which similar letters and figures denote similar parts throughout the several views, and in which—

Figure 1 is a side view of said apparatus. Fig. 2 is a back view of the same. Fig. 3 is a view similar to Fig. 1, the vertical casing E and the front part of the horizontal conical casing B being in section. Fig. 4 is a plan of the parts shown in Fig. 1. Fig. 5 is a plan of the parts shown in Fig. 2; and Fig. 6 is a horizontal section in line 7 8 of Fig. 1.

My improved apparatus consists in general of three principal parts—*i. e.*, the vertical casing A, with its support or base, the vertical casing E, arranged at the side of said casing A, and the conical horizontal casing B, arranged at another side of the said casing A. The rear end of the casing B communicates with the casing A, the position of height of the respective opening being such that the flame of a lamp placed into the casing A lights also the interior of the casing B. The front end of the latter is furnished with a frame C, having at its upper part two angular pieces $k'$, holding a movable plate $k$. The plate $k$ may be moved from the position shown in Fig. 3 to that shown in Fig. 1, and when in this position, Fig. 1, it is secured in place by a hook $k^3$. To hold the photograph, &c., to be copied, the plate $k$ is furnished with a movable plate $h$, which is held and guided by some rods passing through the plate $k$. Springs $i'$ $i^2$, encircling two of said rods, tend to move the plate $h$ off the plate $k$ or to press the plate $h$ against the frame C, respectively.

The support or base of the casing A forms at the same time the oil-basin $v'$, Figs. 2 and 3, for the lamp $y$. However, between the basin $v'$ and the burner of the lamp another basin $u$ is provided, which communicates with an outer reservoir S, Figs. 2, 3, and 6, by means of pipes $s'$ $s^2$. The reservoir S and the basin $u$ are filled with water, the object being to keep the heat of the flame off the oil by letting it be caught up by the water and causing the latter to circulate, so that the heated water passes through the pipe $s^2$ into the reservoir S, where it cools down, whereas the cooled water passes through the pipe $s'$ into the basin $u$.

The communication between the lamp-casing A and the conical casing B may be interrupted by a flap D, Figs. 1 and 3, adapted to swing around an axle located at the lower end of said flap. Said axle projects at one end beyond the casing B, and is provided at said end with a disk N and a lever or arm O, the latter carrying a ring with a net P. The latter serves for the reception of a ball that is introduced into the casing E and is made to roll along and through a way or channel of spiral form. Said way or channel is formed by a strip of metal wound around the casing or cylinder E, and the outer or open side of the said channel is closed by an envelop or cover R, of felt, the object of this material being to produce friction with the ball and thus to lengthen the time of movement of the latter. The ball leaves the said spiral way at $x$, Fig. 1. To further lengthen the time of movement of the ball, I prefer to compose the spiral way of descending parts and of horizontal or even ascending parts. In other words, I interrupt the properly-descending way by horizontal or even ascending parts, as distinctly represented in Fig. 3. The ball when leaving the spiral way at $x$ falls into the net P, and owing to the weight of the ball the lever or arm O is swung downward and the axle holding the flap D is turned in such a direction that the flap D, which up to then was located about parallel to the lower wall of the casing B, is raised so as to interrupt the communication between A and B, or to prevent the light of the flame of the lamp from acting further upon the photograph, &c., to be copied.

The apparatus E R is furnished with a device allowing of predetermining the time of movement of the ball or the time of exposure of the photograph, respectively. Said device is constructed as follows: A part of the felt envelop or cover R is replaced by a vertical strip of sheet metal having as many holes 1 2 3 to 16, Fig. 1, as there are convolutions in the spiral way aforedescribed. The sides of said strip are formed into guides for a slide W, having in its middle part a hole affording access to one of the holes 1 to 16 of the said strip, but covering two holes above the respective one and two below the same. The slide W serves for facilitating the introduction of the ball into a predetermined hole, such means being necessary, as the apparatus is used in a dark room.

At the side of the strip of sheet metal described in the preceding paragraph the apparatus is provided with a vertical axle having at its lower end an angular lever or arm L, connected to the disk M by means of a link N, and having distributed upon its entire length or height sixteen pins $J'$ $J^2$ $J^3$ to $J^{16}$, each of which is adapted to take into the spiral way of the casing E through a suitably-arranged slit. (See Fig. 1.) The disk N forms a connection between said axle, with its pins, and the lever or arm O, with its net P, the connection being such that said pins take through the slits or into the spiral way, respectively, as long as the net P is in the position shown in dotted lines in Fig. 1. During that time the flap D is in its upright position, so that the light of the lamp of the casing A cannot pass into the casing B. The photographs, &c., to be copied should therefore be placed into the copying-frame during that time. This being done, the flap D is turned down by bringing the net P below the exit $x$ of the spiral way, when at the same time the ball, which previously was introduced into the spiral way through any of the holes 1 to 16 and kept back by the respective pin, is released and commences its downward way. The time of exposure depends on the time of movement of the ball and ends when the ball falls down into the net P, because in the next moment the lever or arm O is turned and the flap D is raised, as aforedescribed.

Having thus fully described the nature of this invention, what I desire to secure by Letters Patent of the United States is—

1. In a copying apparatus for photographs and the like, the combination with a casing; a lamp arranged within said casing; another casing located in front of the burner of said lamp; a flap arranged in said other casing; and adapted to keep the light emitted by the lamp off the other casing; a third casing forming a spiral way; a ball adapted to roll down upon said spiral way, and a lever connected to said flap, and extending below the exit of the spiral way, for the purpose as described.

2. In a copying apparatus for photographs and the like, the combination with a casing; a lamp arranged within said casing; another casing located in front of the burner of said lamp; a third casing forming a spiral way; a ball adapted to roll down upon said spiral way; a lever terminating below the exit of said way, and adapted to catch the said ball; a flap arranged in said other casing, and secured to the axle of said lever; and means for keeping the ball back within the casing until said flap is opened so as to allow of the light emitted by the lamp passing into the said second casing, for the purpose as described.

3. In a copying apparatus for photographs and the like, the combination with a casing; a lamp arranged within said casing; another casing located in front of the burner of said lamp; a copying-frame attached to the outer end of said other casing; a flap arranged within the latter, and adapted to keep the light emitted by the lamp off said frame, a third casing forming a spiral way; a ball adapted to roll along the latter; a lever connected to said flap, and terminating below the exit of said spiral way; and a vertical series of openings located at the outer side of said third casing, and serving for the introduction of the ball into the spiral way, for the purpose as described.

4. In a copying apparatus for photographs and the like, the combination with a casing; a lamp arranged within said casing; another casing located in front of the burner of said lamp; a flap arranged in said other casing, and adapted to keep the light emitted by the lamp off the other casing; a third casing forming a spiral way; a ball adapted to roll down upon said spiral way, and a lever connected to said flap, and extending below the exit of the spiral way, said spiral way being composed of descending parts and ascending ones, for the purpose as described.

5. In a copying apparatus for photographs and the like, the combination with a casing; a lamp arranged within said casing; another casing located in front of the burner of said lamp; a flap arranged in said other casing, and adapted to keep the light emitted by the lamp off the other casing; a third casing forming a spiral way; a ball adapted to roll down upon said spiral way, and a lever connected to said flap, and extending below the exit of the spiral way, the outer wall of said spiral way being formed by a layer of felt, for the purpose as described.

6. In a copying apparatus for photographs and the like, the combination with a casing; a lamp arranged within said casing; another casing located in front of the burner of said lamp; a flap arranged in said other casing, and adapted to keep the light emitted by the lamp off the other casing; a third casing forming a spiral way; a ball adapted to roll down upon said spiral way, and a lever connected to said flap, and extending below the exit of the spiral way; the basin of said lamp having a lower compartment for the reception of the oil and an upper compartment for the reception of water; a reservoir for the water, and pipes connecting said reservoir with said upper compartment so as to allow of a circulation of the water, for the purpose as described.

7. In a copying apparatus for photographs and the like, the combination with a casing; a lamp arranged within said casing; another casing located in front of the burner of said lamp; a copying-frame attached to the outer end of said other casing; a flap arranged within the latter, and adapted to keep the light emitted by the lamp off said frame; a third casing forming a spiral way; a ball adapted to roll along the latter; a lever connected to said flap, and terminating below the exit of said spiral way; and a vertical series of openings located at the outer side of said third casing, and serving for the introduction of the ball into the spiral way; a vertical axle arranged at the side of said series of openings and having pins adapted to take into the spiral way and to keep said ball back until said axle is turned, and means connecting said axle with the flap, substantially as described.

8. In a copying apparatus for photographs and the like, the combination with a casing; a lamp arranged within said casing; another casing located in front of the burner of said lamp; a copying-frame attached to the outer end of said other casing; a flap arranged within the latter, and adapted to keep the light emitted by the lamp off said frame; a third casing forming a spiral way; a ball adapted to roll along the latter; a lever connected to said flap, and terminating below the exit of said spiral way; and a vertical series of openings located at the outer side of said third casing, and serving for the introduction of the ball into the spiral way, and a slide adapted to be moved along upon said series of openings, and having an opening adapted to afford access to one of said openings, substantially as described.

In testimony whereof I have signed this specification in the presence of two subscribing witnesses.

EMIL BÜHLER.

Witnesses:
AUGUST BECKER,
JACOB ADRIAN.